(12) United States Patent
Suzuki

(10) Patent No.: US 6,408,809 B2
(45) Date of Patent: Jun. 25, 2002

(54) INTAKE CONTROL DEVICE FOR MULTI-CYLINDER V-TYPE ENGINE

(75) Inventor: Minoru Suzuki, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/681,372

(22) Filed: Mar. 26, 2001

(30) Foreign Application Priority Data

Apr. 17, 2000 (JP) ......................................... 2000-114932

(51) Int. Cl.⁷ ........................... F02B 75/22; F02B 27/02; F02B 31/00
(52) U.S. Cl. ........................... 123/184.31; 123/184.55; 123/184.36
(58) Field of Search ............... 123/184.36, 184.55, 123/184.31, 184.34, 184.35

(56) References Cited

U.S. PATENT DOCUMENTS

| | | | | |
|---|---|---|---|---|
| 4,739,735 A | * | 4/1988 | Ichida et al. | 123/184.31 |
| 4,741,295 A | * | 5/1988 | Hosoya et al. | 123/184.31 |
| 4,854,271 A | * | 8/1989 | Miyano et al. | 123/184.31 |
| 4,875,438 A | * | 10/1989 | Suzuki et al. | 123/184.31 |
| 5,005,536 A | * | 4/1991 | Suzuki et al. | 123/184.55 |
| 5,081,962 A | * | 1/1992 | Kurokawa et al. | 123/184.36 |
| 5,590,628 A | * | 1/1997 | Patyi et al. | 123/184.36 |
| 5,632,239 A | * | 5/1997 | Patyi et al. | 123/184.36 |
| 5,787,851 A | | 8/1998 | Sakurai et al. | |
| 5,911,205 A | * | 6/1999 | Gambardella | 123/184.35 |
| 5,960,759 A | * | 10/1999 | Ohsuga et al. | 123/184.31 |
| 6,202,627 B1 | * | 3/2001 | Akima | 123/184.34 |

\* cited by examiner

*Primary Examiner*—Marguerite McMahon
*Assistant Examiner*—Jason Benton
(74) *Attorney, Agent, or Firm*—Ernest A. Beutler

(57) ABSTRACT

An improved compact and highly efficient variable tuned intake system for a V-type, multi-cylinder engine. The induction system provides variable tuning length with both the high speed and low speed inlets being directed away from the valley between the cylinder banks to minimize the change in the flow directions into the combustion chambers.

27 Claims, 2 Drawing Sheets

INTAKE CONTROL DEVICE FOR MULTI-CYLINDER V-TYPE ENGINE

BACKGROUND OF INVENTION

This invention relates to an intake control device for a multi-cylinder, v-type, internal combustion engine and more particularly to an improved tuned type intake system for such an engine.

It has been acknowledged that the performance of an internal combustion engine can be improved over a wide range of speed and load conditions by utilizing what is referred to as a "variable tuned" intake system. Such intake systems have the capability of providing different effective lengths for the intake runners so as to improve charging efficiency under varying running conditions. For example, it is known that for good low speed charging efficiency, the intake path should be long while to improve charging efficiency under high speed high load conditions, it should be very short. A number of types of arrangements have been proposed for providing this type of result.

Once such arrangement is shown in U.S. Pat. No. 5,787,851, issued Aug. 4, 1998 and entitled "Intake Control System", which patent is assigned to the assignee hereof. In that arrangement, there is provided a plenum chamber into which the intake tracts for each cylinder of the engine extend, at least in part. The intake tracts have two separate openings into the plenum chamber, one of which is valved. Generally this is the shorter intake path and its opening is closed under low and mid range running conditions. By opening the valve at higher speed conditions, the effective length of the intake passage is shortened and it is tuned for better high speed, high load performance.

As shown in that patent, the induction system is described in conjunction with a V-type engine wherein the plenum chamber extends through the valley of the V configuration between the cylinder banks. The inlet openings of both of the long and short parts of the passages extend in a direction facing toward the valley. This means that the intake charge must change direction to flow into the intake tract for each cylinder. This change in flow direction creates a restriction to flow which, particularly under high speed high load conditions, can deteriorate the performance from that desired.

It is, therefore, a principal object to this invention to provide an improved variable tuned intake system for a V-type engine wherein at least one of the intake passages extends in a direction away from the valley and thus, permits a more direct flow to the intake system to improve performance.

In accordance with a principal feature of the invention, this outwardly facing passage constitutes the high speed path although in the preferred embodiment, both the high and low speed paths face in this direction.

SUMMARY OF INVENTION

This invention is adapted to be embodied in a V-type, multi-cylinder internal combustion engine comprised of a cylinder head, cylinder block arrangement that consists of a pair of angularly disposed cylinder banks with their intake ports disposed adjacent a valley defined between the cylinder banks. An induction is provided for delivering at least an air charge to the intake ports. The induction system is comprised of a surge tank disposed in substantial part in the valley and having an air inlet through which an air charge is delivered to the interior of the surge tank. A plurality of curvilinear intake pipes, each extend from a respective one of the intake ports into the surge tank. Each of the curvilinear intake pipes have a low speed inlet opening in the surge tank at the end remote from the served intake port and a valved high speed inlet opening into the surge tank spaced a lesser distance from the served intake port to provide a substantially lesser flow length from the surge tank to the served intake port when the valved high speed inlet opening is opened. At least the valved high speed inlet opening faces away from the valley into the surge tank.

DETAILED DESCRIPTION

Figure 1:
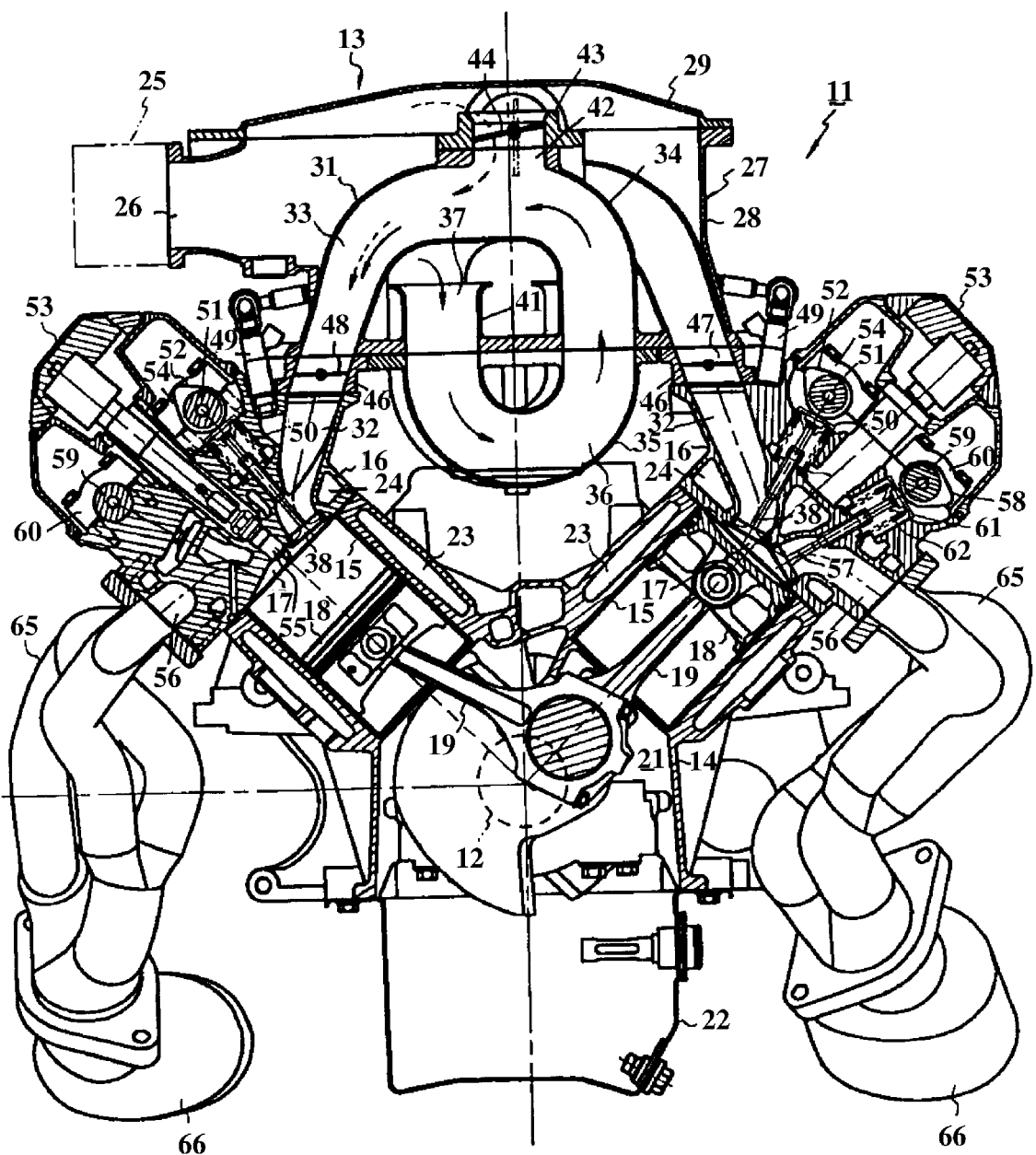
FIG. 1 is a cross sectional view taken through a V-type, multi-cylinder, internal combustion engine constructed in accordance with an embodiment of the invention.

An internal combustion engine constructed in accordance with an embodiment of the invention is shown in FIG. 1 and is identified generally by the reference numeral 11. The engine 11 is shown only in cross section along a plane extending perpendicularly to the axis of rotation of the engine crankshaft, indicated at 12. Since the invention deals primarily with the intake system for the engine, indicated generally by the reference numeral 13, the details of the construction of the engine 11 other than the intake system will be described only summarily.

The engine 11 includes a cylinder block 14 having a pair of angularly disposed cylinder banks in which a plurality of cylinder bores 15 are formed in a suitable manner. Although the number of cylinder bores 15 in each cylinder bank may very depending upon the application of the invention, in the illustrated embodiment the engine is of the V6 type. Thus each cylinder bank has three cylinder bores 15 formed therein.

One end of the cylinder bores 15 is closed by a respective cylinder head 16 that is, in the illustrated embodiment, detachably affixed to the cylinder block 14 in any known manner. The cylinder heads 16 have individual recesses 17 formed in the lower faces thereof which cooperate with the cylinder bores 15 and pistons 18 that reciprocate therein to form the combustion chambers of the engine. Since at top dead center position, the cylinder head recesses 17 form the substantial portion of the clearance volume, at times this number (17) will also be utilized to designate these combustion chambers.

The pistons 18 are connected by means of connecting rods 19 to the individual throws of the crankshaft 12. The crankshaft 12 rotates in a crankcase chamber 21, which is formed by a skirt of the cylinder block 14 and a crankcase member 22 that is detachably affixed thereto. The crankshaft 12 is journalled for rotation in any well known manner.

In the illustrated embodiment, the engine 11 is water cooled and to this end, the cylinder block 14 is formed with cooling jackets 23 which encircle the cylinder bores 15. In a similar manner, the cylinder heads 16 are formed with cooling jackets 24 which communicate with the cylinder block cooling jackets 23. For the aforenoted reasons dealing with the scope of the invention, further description of the cooling system for the engine 11 is not believed to be necessary. Those skilled in the art can readily resort to any preferred type of cooling system.

Referring now in detail to the intake system 13 that delivers an air charge to the combustion chambers 17, it is comprised of an inlet device, which is not shown, but which may include a silencing and air filtering arrangement. This inlet device delivers the inducted air to a throttle body shown in phantom only in FIG. 1 and identified generally by the reference numeral 25. This throttle body 25 includes a throttle valve, which is not shown, but which is operated in response to operator control to control the air flow into the engine combustion chambers 17.

The throttle body 25 delivers the inducted air at a controlled rate into an inlet opening 26 of a plenum chamber device, indicated generally by the reference numeral 27. The plenum chamber device 27 includes a main housing member 28 that extends longitudinally within the valley defined between the cylinder banks of the engine 11. A removable cover 29 closes the plenum chamber.

An intake manifold extends at least in part into the plenum chamber device 27 and has a plurality of curvilinear intake passages or tracts 31, each of which serves a respective intake passage 32 formed in the cylinder heads 16. These curvilinear intake passages 31 include a first generally straight section 33 which, along with the cylinder head intake passages 32, extends generally in an upward direction and away from the valley between the cylinder banks.

This straight section 33 merges into a curved section 34 which curves towards the opposite cylinder bank from the cylinder head intake passage 32 served. A portion of the straight intake section 33 and the curved section 34 extend through the interior of the plenum chamber device 27.

The curved section 34 curves in a downward direction facing downwardly toward the valley between the cylinder banks where it merges with a further curved section 35 having a flow path 36 that extends back toward the cylinder bank being served by the respective intake passage 31.

This passage then curves upwardly and terminates in an upwardly facing inlet opening 37 which faces into the plenum chamber device 27 and actually reenters the plenum chamber from the section 35 and its flow path 36 which is disposed within the valley but outwardly of the plenum chamber device 27.

The portion of the intake passage 31 thus far described comprises the low speed low load running portion and has a generally long length from the inlet opening 37 to the intake valve seats formed at the termination of the cylinder head intake passages 32 which are valved by intake valves 38 operated in a manner, which will be described.

In the illustrated embodiment, there is one intake valve 38 for each cylinder; however, it is to be understood that multiple valve arrangements can be employed having either individual or Siamese intake passages 32. For example, the three intake valve per cylinder arrangement shown in aforenoted U.S. Pat. No. 5,787,851 may be employed.

Figure 2:
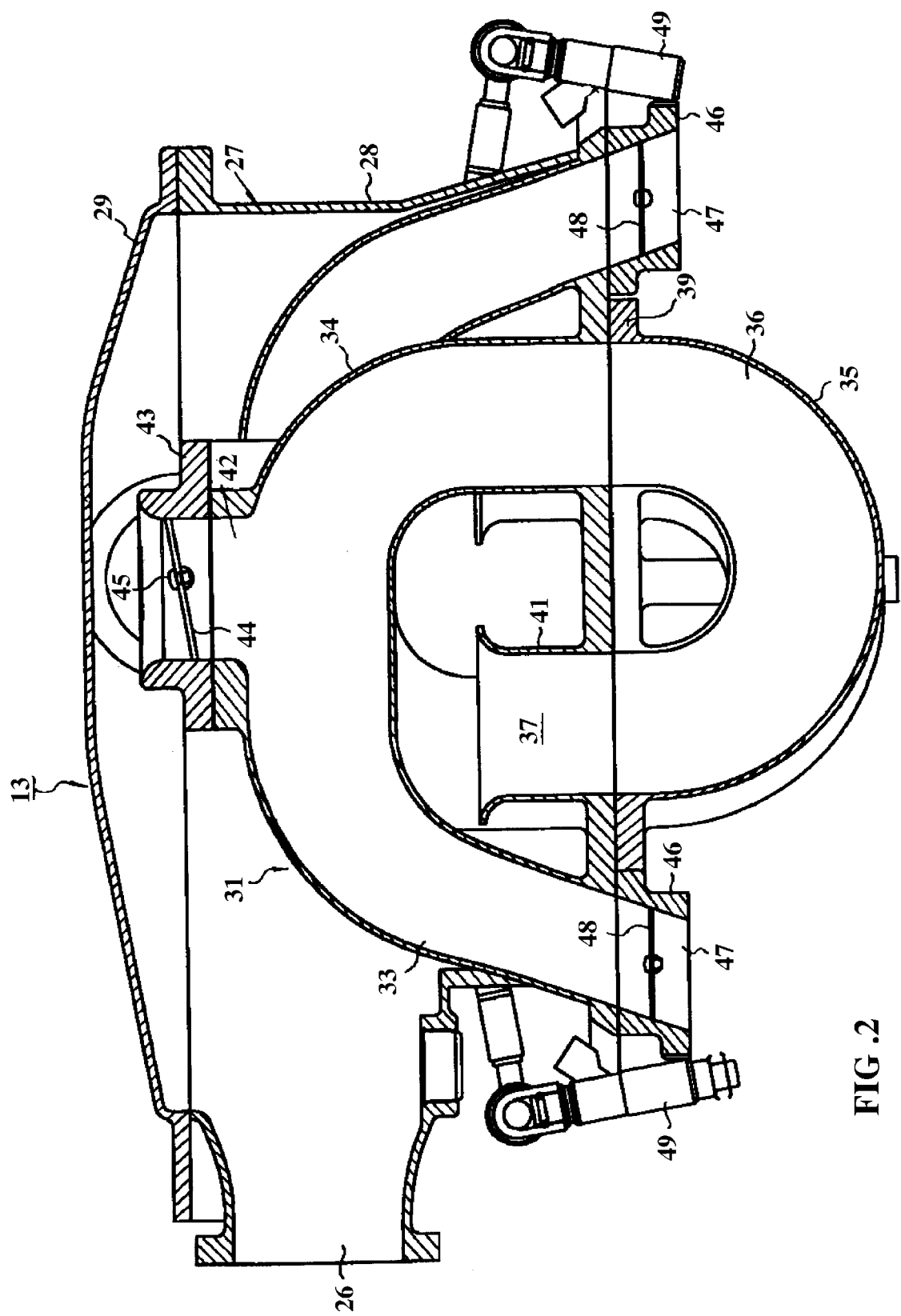
FIG. 2 is an enlarged view of the intake portion shown in FIG. 1 and is taken along the same plane as that figure.

The low speed intake airflow is shown by the solid line arrows in FIG. 1. As best seen in FIG. 2, it will be seen that the flow path 36 of the section 35 is formed by a separate manifold member 39 that is affixed to the underside of the plenum chamber device 27 and as already noted, is spaced outwardly therefrom. The interior of the plenum chamber device 27 can be formed with inlet trumpets 41, which form the low speed air inlet openings 37 as best seen in FIG. 2.

Also, the portion of the intake passage 31 formed inside the plenum chamber device 27 consisting of parts of a flow paths 33 and 34 may be formed by additional tubular members formed within the plenum chamber device 27 and specifically its main housing member 28 and the lower wall thereof.

Intersecting the intermediate portion of the curved part 34 of the intake passages 31, is a high speed inlet opening 42 that is valved by a control valve assembly 43 affixed thereto and within the plenum chamber device 27. Butterfly type control valves 44 are supported on a control valve shaft 45 in this control valve assembly 43 and are operated by a suitable servomotor (not shown) under the control of an ECU so as to open these high speeds paths under higher load and speed conditions. Thus, air can flow almost unobstructively from the plenum chamber inlet opening 26 into the intake passages 31 through the high speed inlets 42 without having to make any major change in flow direction and thus, provide a relatively straight high speed air flow indicated by the broken line arrows in FIG. 1.

To further improve engine performance under low speed low load conditions, tumble valve assemblies, indicated generally by the reference numeral 46, are interposed between the outlet ends of the intake passage sections 33 and the cylinder head intake passages 32. These tumble valves assemblies 46 have a flow path 47 which forms a portion of the straight line flow path of each intake passage 31.

A tumble control valve 48 of a suitable configuration is mounted in these tumble valve assemblies 46 and is also controlled by the ECU so as to introduce a tumble into the intake air charge during lower speed and lower load conditions to further improve induction efficiency and to provide the desired tumble action in the combustion chamber so as to improve flame propagation under these difficult low speed low load running conditions.

In the illustrated embodiment, the engine is provided with a charge forming system comprised of fuel injectors 49 that are mounted on the cylinder heads 16 and which inject into their intake passages 32.

It has been noted that the intake valves 38 are operated by an operating mechanism and this operating mechanism is comprised of an intake camshaft 51 having cam lobes 52 that cooperate with thimble tappets 50 for opening the intake valves 38. The intake camshaft 51 is contained within a cam chamber formed above the cylinder head 16 and closed by a cam cover 53. Split bearing caps 54 are fixed to the cylinder head 16 for journaling the intake camshafts 51. The intake camshafts 51 are driven at one half-crankshaft speed by a suitable timing mechanism.

The intake charge which is delivered into the combustion chambers 17 by the air intake system 13 and the fuel charge injected by the injectors 49 is fired by spark plugs 55 that are mounted in the cylinder heads 16 substantially on the axes of the cylinder bores 15.

The burnt charge is discharged from the combustion chambers through an exhaust system for each bank that is comprised of exhaust passages 56 formed on the side of the cylinder heads 16 away from the valley between the cylinder banks.

The exhaust passages 56 are valved by exhaust valves 57. The exhaust valves 57, like the intake valves 38, are operated by lobes 58 of an exhaust camshaft 59, which is also journalled in the cam chamber. This journaling is done by bearing caps 60. The cam lobes 58 operate the exhaust valves 57 through thimble tappets 61 slidably supported in bores 62 formed in the cylinder head.

The exhaust passages 56 terminate in an outer surface of the cylinder head and respective exhaust manifolds 65 are affixed to the cylinder head surfaces and collect the exhaust gases for discharge to the atmosphere through an exhaust system that includes mufflers 66.

Thus, from the foregoing description, it should be readily apparent that the described embodiment of the invention provides a very effective induction system which is not only compact, but which provides both the desired long and shorts lengths for tuning throughout the entire engine running conditions and which has minimum restriction due to changes in flow direction. Of course, the foregoing description is that of a preferred embodiment of the invention and various changes and modifications may be made without departing from the spirit and scope of the invention, as defined by the appended claims.

What is claimed is:

1. A V-type, multi-cylinder, internal combustion engine comprised of a cylinder head, cylinder block arrangement consisting of a pair of angularly disposed cylinder banks with intake ports disposed adjacent a valley defined between said cylinder banks, and an induction system for delivering at least an air charge to said intake ports, said induction system being comprised of a single surge tank disposed in substantial part in said valley and having an air inlet through which an air charge is delivered to said surge tank, a plurality of curvilinear intake pipes, each extending from a respective of said intake ports into said surge tank, each of said curvilinear intake pipes having a low speed inlet opening in said surge tank at its end remote from the served intake port and a valved high speed inlet opening in said surge tank spaced a lesser distance from the served intake port to provide a substantially lesser flow length from said surge tank to the served intake port when said valved high speed inlet opening is opened, at least said valved high speed inlet opening facing away from said valley into said surge tank.

2. A V-type, multi-cylinder, internal combustion engine as set forth in claim 1 wherein each of the curvilinear intake pipe low speed inlet openings also face away from the valley into the surge tank.

3. A V-type, multi-cylinder, internal combustion engine as set forth in claim 1 wherein each of the curvilinear intake pipes is comprised of a generally straight outlet end extending from the served intake port in a generally upward direction into the valley and a second, curved portion extending toward the other cylinder bank from that containing said served intake port and then curving back toward the cylinder bank containing the served intake port.

4. A V-type, multi-cylinder, internal combustion engine as set forth in claim 3 wherein the second, curved portion of each of the curvilinear intake pipes terminates in a further curved part extending away from the valley and terminating at the respective low speed inlet opening.

5. A V-type, multi-cylinder, internal combustion engine as set forth in claim 4 wherein at least a part of the second, curved portion of each of the curvilinear intake pipes extends outside of the surge tank.

6. A V-type, multi-cylinder, internal combustion engine as set forth in claim 4 wherein the valved high speed inlet opening of each of the curvilinear intake pipes is formed in its respective second, curved portion.

7. A V-type, multi-cylinder, internal combustion engine as set forth in claim 6 wherein the valved high speed inlet opening is formed in the part of the second, curved portion extending toward the other cylinder bank from that containing the served intake port.

8. A V-type, multi-cylinder, internal combustion engine as set forth in claim 7 wherein at least a part of the second, curved portion of each of the curvilinear intake pipes extends outside of the surge tank.

9. A V-type, multi-cylinder, internal combustion engine as set forth in claim 8 wherein a tumble control valve is positioned adjacent each of the intake ports for selectively inducing a tumble flow to the intake charge entering an associated cylinder.

10. A V-type, multi-cylinder, internal combustion engine as set forth in claim 1 wherein each cylinder bank is formed with a plurality of cylinders and intake ports.

11. A V-type, multi-cylinder, internal combustion engine as set forth in claim 10 wherein each of the curvilinear intake pipe low speed inlet openings also face away from the valley into the surge tank.

12. A V-type, multi-cylinder, internal combustion engine as set forth in claim 10 wherein each of the curvilinear intake pipes is comprised of a generally straight outlet end extending from the served intake port in a generally upward direction into the valley and a second, curved portion extending toward the other cylinder bank from that containing said served intake port and then curving back toward the cylinder bank containing the served intake port.

13. A V-type, multi-cylinder, internal combustion engine as set forth in claim 12 wherein the second, curved portion of each of the curvilinear intake pipes terminates in a further curved part extending away from the valley and terminating at the respective low speed inlet opening.

14. A V-type, multi-cylinder, internal combustion engine as set forth in claim 13 wherein at least a part of the second, curved portion of each of the curvilinear intake pipes extends outside of the surge tank.

15. A V-type, multi-cylinder, internal combustion engine as set forth in claim 14 wherein the valved high speed inlet opening of each of the curvilinear intake pipes is formed in its respective second, curved portion.

16. A V-type, multi-cylinder, internal combustion engine as set forth in claim 15 wherein the valved high speed inlet opening is formed in the part of the second, curved portion extending toward the other cylinder bank from that containing the served intake port.

17. A V-type, multi-cylinder, internal combustion engine as set forth in claim 16 wherein at least a part of the second, curved portion of each of the curvilinear intake pipes extends outside of the surge tank.

18. A V-type, multi-cylinder, internal combustion engine as set forth in claim 17 wherein a tumble control valve is positioned adjacent each of the intake ports for selectively inducing a tumble flow to the intake charge entering an associated cylinder.

19. A V-type, multi-cylinder, internal combustion engine as set forth in claim 1 wherein the cylinder head of each bank includes a pair of cam shafts for operating valves therein and the single surge tank is disposed transversely between the camshafts of each cylinder bank closest to the valley.

20. A V-type, multi-cylinder, internal combustion engine as set forth in claim 19 wherein the air inlet to the surge tank extends over one of the camshafts.

21. A V-type, multi-cylinder, internal combustion engine comprised of a cylinder head, cylinder block arrangement consisting of a pair of angularly disposed cylinder banks with intake ports disposed adjacent a valley defined between said cylinder banks, and an induction system for delivering at least an air charge to said intake ports, said induction system being comprised of a surge tank disposed in substantial part in said valley and having an air inlet through which an air charge is delivered to said surge tank, a plurality of curvilinear intake pipes, each extending from a respective of said intake ports into said surge tank, each of said curvilinear intake pipes having a low speed inlet opening in said surge tank at its end remote from the served intake port and a valved high speed inlet opening in said surge tank spaced a lesser distance from the served intake port to provide a substantially lesser flow length from said surge tank to the served intake port when said valved high speed inlet opening is opened, at least said valved high speed inlet opening facing away from said valley into said surge tank, each of said curvilinear intake pipes being comprised of a generally straight outlet end extending from the served intake port in a generally upward direction into said valley and a second, curved portion extending toward the other cylinder bank from that containing said served intake port and then curving back toward the cylinder bank containing the served intake port.

22. A V-type, multi-cylinder, internal combustion engine as set forth in claim 21 wherein the second, curved portion of each of the curvilinear intake pipes terminates in a further curved part extending away from the valley and terminating at the respective low speed inlet opening.

23. A V-type, multi-cylinder, internal combustion engine as set forth in claim 22 wherein at least a part of the second, curved portion of each of the curvilinear intake pipes extends outside of the surge tank.

24. A V-type, multi-cylinder, internal combustion engine as set forth in claim 22 wherein the valved high speed inlet opening of each of the curvilinear intake pipes is formed in its respective sound, curved portion.

25. A V-type, multi-cylinder, internal combustion engine as set forth in claim 24 wherein the valved high speed inlet opening is formed in the part of the second, curved portion extending toward the other cylinder bank from that containing the served intake port.

26. A V-type, multi-cylinder, internal combustion engine as set forth in claim 25 wherein at least a part of the second, curved portion of each of the curvilinear intake pipes extends outside of the surge tank.

27. A V-type, multi-cylinder, internal combustion engine as set forth in claim 26 wherein a tumble control valve is positioned adjacent each of the intake ports for selectively inducing a tumble flow to the intake charge entering an associated cylinder.

* * * * *

UNITED STATES PATENT AND TRADEMARK OFFICE
CERTIFICATE OF CORRECTION

PATENT NO. : 6,408,809 B2
DATED : June 25, 2002
INVENTOR(S) : Minoru Suzuki

It is certified that error appears in the above-identified patent and that said Letters Patent is hereby corrected as shown below:

Column 8,
Line 2, delete "sound" and insert -- second --.

Signed and Sealed this

Fourteenth Day of January, 2003

JAMES E. ROGAN
*Director of the United States Patent and Trademark Office*